Jan. 30, 1968     T. S. WOODS     3,365,802
NAVIGATIONAL INSTRUMENT
Filed Oct. 4, 1965
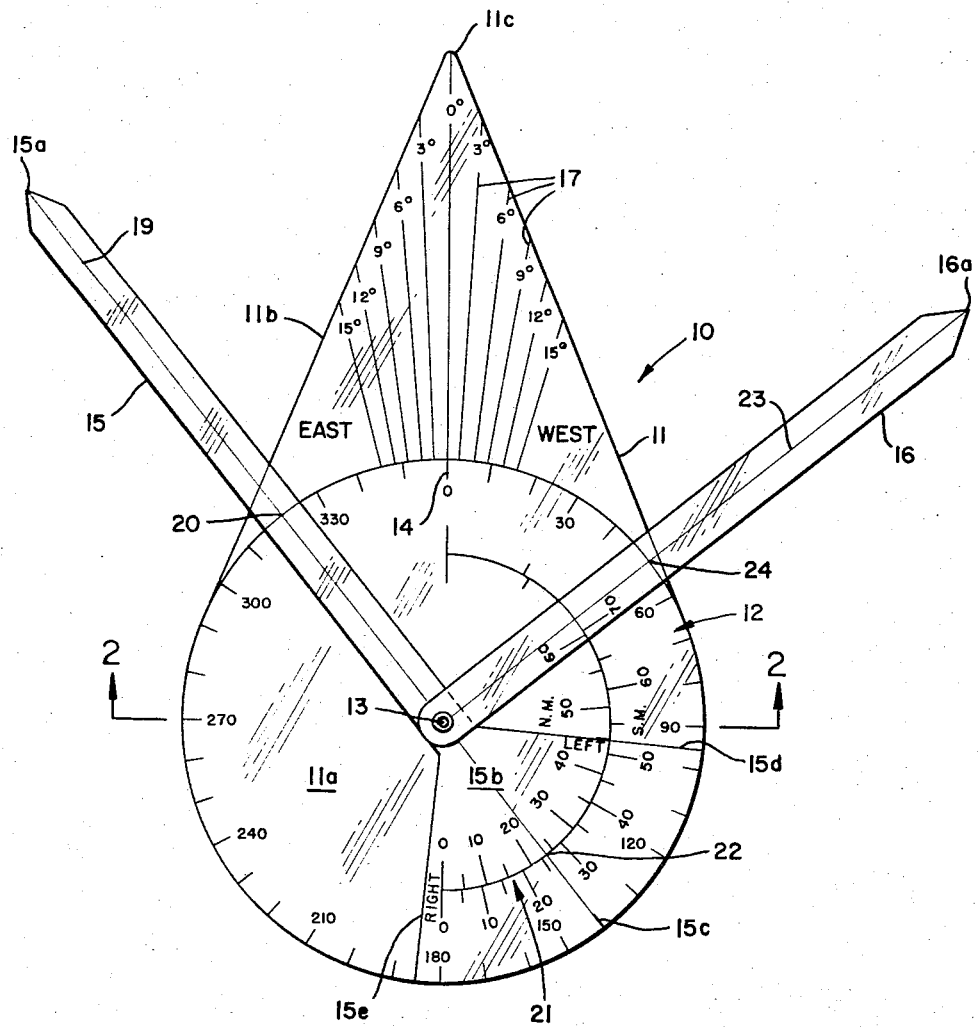
FIG_1
FIG_2
*INVENTOR.*
T. SHERMAN WOODS
BY
Mellin, Moore & Weissenberger
ATTORNEYS

Patented Jan. 30, 1968

3,365,802
NAVIGATIONAL INSTRUMENT
T. Sherman Woods, Studio City, Calif.
(5226 N. 20th St., B2, Phoenix, Ariz. 85016)
Filed Oct. 4, 1965, Ser. No. 492,737
5 Claims. (Cl. 33—75)

ABSTRACT OF THE DISCLOSURE

A navigational device which includes a base having a compass rose thereon, a series of radial lines on the base extending beyond the compass rose, and a pair of arms connected to the center point of the compass rose, the arms being pivotally connected to the center point to act in conjunction with each other, the compass rose, and the radial lines to provide navigational information.

This invention relates to a light weight, portable navigational instrument particularly useful in plotting an aircraft in-flight position by taking bearings on two VHF omnirange (VOR) stations. It is also capable of quickly measuring ground distances from a Sectional Aeronautical Chart and has the additional capability of adding 135° or 225° to a bearing to quickly yield a bearing for entry into a left or right landing pattern respectively, given the magnetic bearing of the runway upon which the aircraft intends to land. It may also be used to conveniently determine either the true or magnetic bearing from a point to a second point on a sectional chart.

When piloting an aircraft alone, navigation is often cumbersome to the majority of pilots, The usually cramped quarters of the cockpit make spreading a sectional chart difficult and make the layout and plotting of bearings on the chart an even more difficult and cumbersome task.

More particularly, prior to the present invention, to plot-in-flight position the pilot was required to:
 (1) Obtain the magnetic bearing of two directionally diverse omnirange stations
 (2) Convert the magnetic bearings to a true bearing or azimuth, and
 (3) Plot the two true bearings on a sectional chart by measuring the azimuth from a true north grid line and then drawing a straight line passing through the respective VOR station.

The intersection of the two plotted lines yields the aircraft position.

Moreover, prior to the present invention, the measurement of ground distance on a sectional chart including conversion of the map distance to either statute or nautical miles was cumbersome. In addition, computation of the bearing for entry into a landing pattern required mental arithmetic which introduces the possibility of human error into the computation.

Accordingly it is an object of the present invention to provide a light weight, compact, simply operated navigational instrument for plotting aircraft in-flight position, given the magnetic bearing to two omnirange stations.

It is a further object to provide a navigational instrument with the additional capability of quickly and accurately converting map distance to actual ground distance in either statute or nautical miles.

It is a further object to provide a navigational instrument capable of plotting aircraft in-flight position which has the additional capability of quickly and accurately converting a runway magnetic bearing or azimuth to a magnetic bearing or azimuth for entry into the landing pattern, be it a left pattern or right pattern.

It is also an object to provide a navigational instrument as described above which may also be used to determine both the magnetic and true bearing from a point on a sectional chart to a second point on the chart.

Each of the above objects is fulfilled by the specific embodiment shown in the drawings, wherein:
 FIG. 1 is a top view of the invention, and;
 FIG. 2 is a sectional view taken on the line 2—2 of FIG. 1.

With reference to FIG. 1, the invention 10 comprises a base 11 consisting of a circular portion 11a and roughly triangular base extension 11b. Compass rose 12 is etched or printed on the periphery of circular portion 11a and defines center point 13 and includes zero degree radial 14. Arm 15 is pivotally mounted to base 11 at center point 13 and intersects compass rose 12 and terminates at point 15a beyond compass rose 12. Arm 16 is also pivotally mounted to base 11 at center point 13 and also intersects compass rose 12 to terminate at point 16a. a series of angularly spaced radials 17 are etched or printed on base extension 11b at 3° increments. Radials 17 radiate from center point 13. Base point 11c is defined by the intersection of zero degree radial 14 with the periphery of base extension 11b.

Compass rose 12 is disposed on the periphery of circular portion 11a of base 11. It may consist of varying increments from 1° to 10° and be printed or etched into the surface of base portion 11a. Compass rose 12 is oriented so that zero degree radial 14 bisects base extension 11b.

Arm 15 is pivotally mounted to base 11 at center point 13 by means of grommet 18. Arm 15 extends beyond compass rose 12 and base 11. Hairline 19 extends from center point 13 to terminating point 15a of arm 15. Hairline 19 accordingly intersects compass rose 12 and defines a first intercept 20 which, in FIG. 1 is 320°.

Arm 15 includes integrally formed arm extension 15b. Arm extension 15b provides three points of reference, 15c, 15d and 15e. Reference point 15c is defined by an extension of hairline 19 which intersects distance scale 21 to thereby define a distance intercept 22. Distance intercept 22 varies proportionally with the variation in the distance between base point 11c and terminating point 15a of arm 15. Thus as arm 15 is pivoted about center point 13 and the position of point 15a with respect to point 11c varies, distance intercept 22 also varies.

Distance scale 21 is graduated in both statute miles and nautical miles. It is calibrated so that when point 15a of arm 15 coincides with base point 11c, the distance reading is zero and to yield an actual ground distance when the distance between point 15a and base point 11c is finite. Thus the graduations of distance scale 21 must be related to the scale of the sectional chart with which the invention 10 is to be used. The scale of the common sectional chart is about 8 miles to an inch. Thus distance scale 21 should be graduated so that when the distance between point 15a and base point 11c is one inch, the distance intercept is 8 statute miles. It may also be graduated to read nautical miles and such a graduation should be such that the distance intercept, in the above situation, reads 7 nautical miles. As a further example, with arm 15 in the position shown in FIG. 1, and assuming the invention is drawn to actual size, the distance between base point 11c and point 15a is 3 5/16 inches. Distance intercept 22 reads 23 nautical miles and about 26 statute miles.

Arm 16 is similar to arm 15 although it has no extension. Arm 16 is pivotally mounted to base 11 at center point 13 by means of grommet 18. Like arm 15, it extends beyond compass rose 12 terminating at point 16a and includes hairline 23. Hairline 23 intersects compass rose 12 to define a second intercept 24 which, in FIG. 1, is 50°. Arm 16 is pivotable on base 11 independent of arm 15. Thus they may be positioned so that first intercept 20 and second intercept 24 may lie anywhere on compass rose 12.

Arm extension 15b, as previously disclosed, contains reference points 15d and 15e. Points 15d and 15e are defined by the edge of extension 15b. The edges extend radially from center point 13 and intersect compass rose 12 to define a third and fourth intercept. The angular distance from hairline 19 to third intercept 15d, with reference to center point 13, is 135°. The angular distance from hairline 19 to fourth intercept 15e is 225°, when considered clockwise about center point 13; or may be viewed as 135° from hairline 19 when measured in a counterclockwise direction about center point 13 as shown in FIG. 1. Thus third and fourth intercepts 15d and 15e will always be 135° and 225°, respectively, greater than first intercept 20. Moreover the reading will automatically compensate for exceeding 360° in the arithmetic process. In other words and with reference to FIG. 1, the addition of 135° to first intercept 20 (320°) directly yields 95° at third intercept 15d as opposed to yielding 455° from which 360° must be subtracted to yield a meaningful bearing or azimuth. The usefulness of third and fourth intercepts 15d and 15e is explained below.

It will be noted that grommet 18 contains an opening sufficiently large so that a pencil point may be inserted therein to mark a point on the sectional chart with which the invention is used.

Each of the elements of the invention, namely the base 11, arm 15 and arm 16 consist preferably of transparent but reasonably rigid material.

The invention may be used to:

(1) Determine in-flight position, given the magnetic bearing to two VOR stations, (2) Measure ground distance on a sectional chart, (3) Determine the magnetic bearing for pattern entry, and (4) Determine either the true or magnetic bearing from one point to another on a sectional chart.

To determine the in-flight position of the aircraft with the navigational instrument described, the magnetic bearing to two directionally diverse VOR stations is obtained. For the purpose of the present explanation it may be assumed that the magnetic bearing to one station is 320° and to the other station is 50°. Arms 15 and 16 are positioned so that first intercept 20 is 320° and second intercept 24 is 50° (see FIG. 1). The instrument is then layed on the sectional chart with hairline 19 (or extension thereof) passing through the VOR station shown on the map to which the bearing is 320°; and with hairline 23 (or extension thereof) passing through the other VOR station shown on the map to which the bearing is 50°; and with the radial 17 which corresponds with the magnetic declination in the area parallel with the north-south grid line on the sectional chart. The aircraft position is at the center point 13 and a pencil may be used to mark the point by inserting it into grommet 18.

To measure distance, base point 11c is placed on the sectional chart at one point and point 15a of arm 15 is pivoted so that it is placed on the other point. The ground distance between the two points on the sectional chart is read at distance intercept 22. Assuming the distance on the sectional chart is that distance actually shown between point 15a and base point 11c in FIG. 1, the actual ground distance is about 26 statute miles and 23 nautical miles.

To determine the magnetic bearing for pattern entry, first intercept 20 is set on the magnetic bearing of the runway upon which the aircraft intends to land. Again using the setting in FIG. 1 as the example, if the aircraft will land on runway 32 (numbered in the conventional manner) first intercept 20 is set at 320°, which is the magnetic bearing of the runway. Assuming a normal landing pattern which consists of an entry into the pattern, a 45° turn to the down-wind leg, a 90° turn to base-leg and a 90° turn to final, the magnetic bearing for entry into a left pattern is read at third intercept 15d as 95°. The magnetic bearing for entry into a right pattern is read at fourth intercept 15e as 185°.

It should be noted that the bearings for entry into the pattern do not take into account wind direction and velocity.

To determine the true or magnetic bearing from one point to another, center point 13 is placed on one of the points on the sectional chart. Hairline 19 or 23, depending upon which arm is used, is pivoted on base 11 so that it passes through the second point to which the bearing point is desired. To obtain a true bearing, zero degree radial 14 is positioned parallel to a north-south grid line and the true bearing is read at the intersection of the hairline and compass rose 12. To obtain a magnetic bearing, the radial 17 corresponding to the magnetic declination in the area is aligned parallel with a north-south grid line and the magnetic bearing is read at the intersection of the hairline used for compass rose 12.

Variations may be made in the embodiment shown without departing from the scope of the invention. Ground distance scale 21 may be separated so that the statute mile graduations are located in one half of compass rose 12 and the nautical mile graduations are located in the other half. With such a variation, ground distance would read in statute miles with point 15a on one side of base point 11c and would read in nautical miles with point 15a on the other side of base point 11c. In addition the mounting of arms 15 and 16 to base 11 may vary from the means shown, as long as movement of the arms is confined to radial movement with respect to center point 13. Additional scales might be added to the base and used in conjunction with arms 15 and 16 for additional purposes.

Having thus described my invention, I claim:

1. A navigational instrument which comprises:

a base;

a compass rose on said base, said compass rose defining a center point and a zero degree radial;

a first arm pivotally mounted to said base and extending radially from said center point, intersecting said compass rose to thereby define a first intercept, and terminating at a point beyond said first intercept;

a second arm pivotally mounted to said base and extending radially from said center point, intersecting said compass rose to thereby define a second intercept and terminating at a point beyond said second intercept; and a series of radially extending lines on said base beyond said compass rose, said lines defining known angular increments on both sides of said zero degree radial wherein said zero degree radial defines a base point at the intersection thereof with the periphery of said base; and a graduated distance scale on said base, said scale being intersected by said first arm to thereby define a distance intercept, said distance intercept being directly proportional to the distance from said terminating point of said first arm to said base point.

2. A navigational instrument which comprises:

a base;

a compass rose on said base, said compass rose defining a center point and a zero degree radial;

a first arm pivotally mounted to said base and extending radially from said center point, intersecting said compass rose to thereby define a first intercept, and terminating at a point beyond said first intercept;

a second arm pivotally mounted to said base and extending radially from said center point, intersecting said compass rose to thereby define a second intercept and terminating at a point beyond said second intercept; and a series of radially extending lines on said base beyond said compass rose, said lines defining known angular increments on both sides of said zero degree radial wherein said first arm defines a third and fourth compass rose intercept, said third intercept defining an angular distance of 135° from said first intercept, and said fourth intercept defining an angular distance of 225° from said first intercept.

3. The navigational instrument of claim 1 wherein said base and said arms are transparent.

4. The navigational instrument of claim 1 wherein said graduated distance scale is graduated to read in statute miles and nautical miles.

5. A navigational instrument which comprises:
a transparent base;
a compass rose on said base, said compass rose defining a center point and a zero degree radial, said zero degree radial defining a base point at the intersection thereof with the periphery of said base;
a first transparent arm pivotally mounted to said base and extending radially from said center point, intersecting said compass rose to thereby define a first intercept, and terminating at a point beyond said first intercept;
a second transparent arm pivotally mounted to said base and extending radially from said center point, intersecting said compass rose to thereby define a second intercept, and terminating at a point beyond said second intercept;
a transparent extension movable with said first arm, said extension defining a third and fourth compass rose intercept, said third intercept defining an angular distance of 135° from said first intercept, and said fourth intercept defining an angular distance of 225° from said first intercept;
a graduated distance scale on said base, said scale being intersected by said first arm to thereby define a distance intercept, said distance intercept being directly proportional to the distance from said terminating point of said first arm to said base point; and
a series of radially extending lines on said base beyond said compass rose, said lines defining known angular increments on both sides of said zero degree radial.

References Cited
UNITED STATES PATENTS

| | | | |
|---|---|---|---|
| 1,226,141 | 5/1917 | Sterling et al. | 33—75 |
| 2,278,440 | 4/1942 | Graves | 33—75 |
| 3,093,905 | 6/1963 | Zaher | 33—75 |

HARRY N. HAROIAN, *Primary Examiner.*